June 25, 1935. L. BLUMENSTOCK Re. 19,620

SHIRT ENVELOPE

Original Filed June 5, 1931

INVENTOR

Louis Blumenstock

BY his ATTORNEY

Thompson & Field.

Reissued June 25, 1935 Re. 19,620

UNITED STATES PATENT OFFICE 19,620

SHIRT ENVELOPE

Louis Blumenstock, Brooklyn, N. Y., assignor to Spear Box Company, New York, N. Y., a corporation of New York Original No. 1,868,458, dated July 19, 1932, Serial No. 542,344, June 5, 1931. Application for reissue June 15, 1934, Serial No. 730,788

2 Claims. (Cl. 229—87)

My invention relates to improvements in shirt envelopes, and more particularly, has reference to and is illustrated in the accompanying drawing in its application to an article of the class described providing a pocket, sheath or partial closure within which a laundered shirt may be conveniently slid, retained in shape, and also hung up, if desired, as well as being adapted for convenient packing and delivery, the shirt for the most part being covered and protected against soiling while handling.

Figure 1:
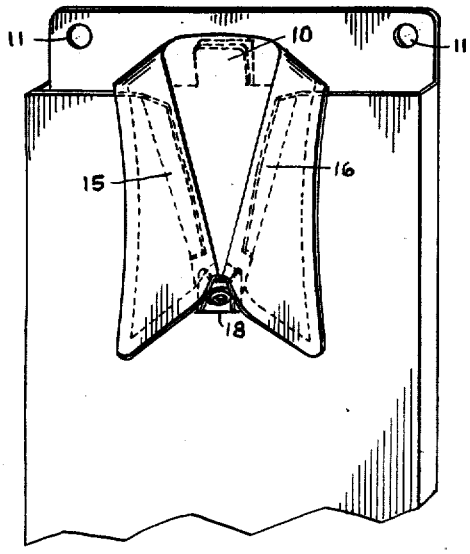
Figure 2:
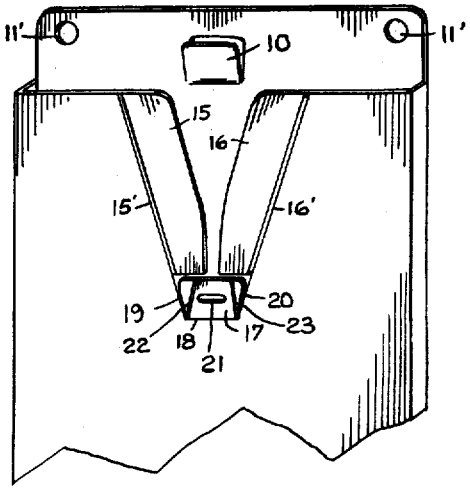
Figure 3:
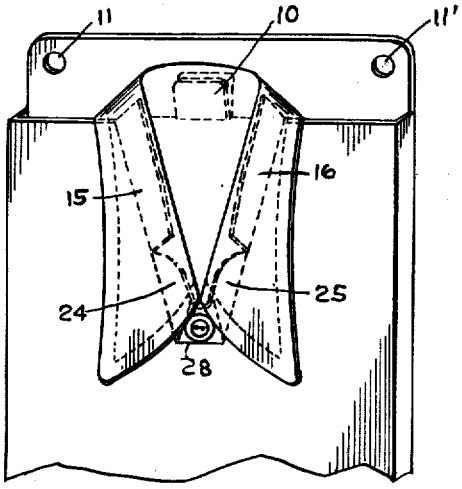

Referring to said drawing, Fig. 1 illustrates in perspective, with the lower part cut away, a suitable form of card envelope containing a shirt, and embodying an application of my invention. Fig. 2 is a view of the envelope shown in Fig. 1 with the shirt removed. Fig. 3 is a modification of the form shown in Fig. 1 showing the shirt in position, and Fig. 4, a similar view with the shirt omitted.

The entire envelope is preferably made of light weight card suitably glued together at their adjacent edges, preferably at the back. A flap 10 is adapted to enter beneath the collar or band of the shirt for supporting the shirt upright in the envelope, and the holes 11, 11', serve conveniently for hanging the shirt contained envelopes preliminary to packing or delivery of the same.

At the front of the envelope, it will be observed that it is cut away, terminating in a restricted lower portion at the center, adapted to receive the top front button of the shirt, the distance of the button hole 21 below the flap 10 being about equal to the distance of the top front button of the shirt from the back button hole of the shirt band when the shirt is laundered, so that the shirt is supported within the container at either or both of these points when suspended by the holes 11, 11'.

Figure 4:
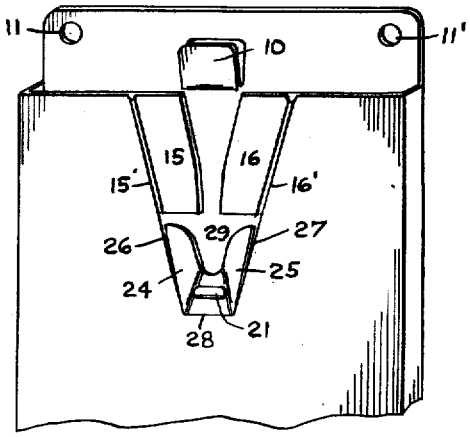

Referring now more particularly to Figs. 3 and 4, it will be observed that instead of cutting the top front of the envelope as shown in Figs. 1 and 2, the flaps 15, 16 are shorter and the flaps 24, 25 longer, the former engaging snugly beneath the collar of the shirt giving it support and shape independently of any support provided by the flaps 24, 25.

The flaps 15, 16, hinged at 15', 16', are provided with corrugations, allowing the flaps 15, 16 to flex freely thereby accommodating themselves to collars of different types. The lower flap 17 is also hinged at 18 and cut away at 19, 20, and is provided with a central button hole 21, and corrugations at 22, 23, to allow the lateral margins to adapt themselves readily to the type of collar upon the shirt.

In the modifications shown in Figs. 3 and 4, the lower flaps 24, 25, are cut clear of the envelope at 26, 27, respectively, but are hinged at the base, as indicated at 28, and the same is preferably V'd, as indicated at 29, to render the same adaptable for varying types of shirt collars.

While the foregoing illustrates various types of shirt envelopes providing means for supporting the shirt within the envelope, and means independently thereof for suspending the envelope with the shirt therein, it will be readily understood that various modifications may be made in the construction and arrangement of parts without departing from the spirit of the invention as claimed.

I claim:

1. A shirt envelope having a front portion provided with an opening adapted to clear the collar of the shirt, means adjacent the bottom of said opening for engaging the top button of the shirt for preventing relative movement of said shirt and said envelope in any direction, and means in combination with that part of the front adjacent said opening for supporting the collar in a plane at an angle to the plane of said front portion.

2. A shirt envelope having a front portion provided with an opening adapted to clear the collar of the shirt, means adjacent the bottom of said opening for engaging the top button of the shirt for preventing relative movement of said shirt and said envelope in any direction, and flaps hinged to said front portion at opposite sides of said opening adapted to engage beneath the sides of the collar for supporting the same in a plane at an angle to the plane of said front portion.

LOUIS BLUMENSTOCK.